Patented Jan. 8, 1946

2,392,608

UNITED STATES PATENT OFFICE 2,392,608

PROCESS OF PREPARING SUBSTITUTED MELAMINES

Daniel E. Nagy, Stamford, Conn., assignor to American Cyanamid Company, New York, N. Y., a corporation of Maine No Drawing. Application September 14, 1944, Serial No. 554,154

8 Claims. (Cl. 260—249.5)

This invention relates to a new method of preparing substituted melamines.

I have discovered that aliphatic-, cycloaliphatic-, and aromatic-substituted melamines can be prepared by causing aliphatic, cycloaliphatic and aromatic secondary amines to react with 1,3-dicyanoguanidine under the conditions described hereinafter. The reaction whereby the substituted melamines are prepared may be illustrated by means of the following equation. As a first step in the reaction, a salt is probably formed by the secondary amine and the acidic 1,3-dicyanoguanidine as follows:

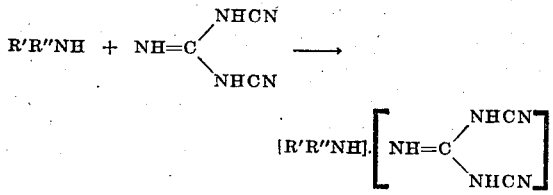

On heating, the 1,3-dicyanoguanidine amine salt rearranges and a N1-di-substituted melamine is formed as follows:

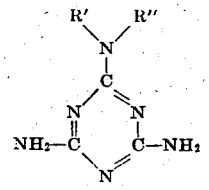

In the above formulae R' and R" represent the same, or different, aliphatic, cycloaliphatic or aromatic radicals.

The compound, 1,3-dicyanoguanidine, is new but its properties and preparation are described in the copending application of Donald W. Kaiser and Jack T. Thurston, Serial No. 524,072, filed February 26, 1944, now Patent No. 2,371,100, issued March 6, 1945. The compound is prepared by mixing together dicyandiamide, a water-soluble alkali metal or alkaline earth metal hydroxide and thereafter adding cyanogen chloride. Ordinarily the product is obtained in the form of an alkali metal or alkaline earth metal salt, but the free acid may be obtained by neutralizing the alkali metal or alkaline earth metal salt-forming group with a strong inorganic acid. Various other metal, ammonium and amine salts of 1,3-di-cyanoguanidine may be prepared by neutralization of the free acid or by methods of double decomposition. Since the 1,3-dicyanoguanidine is most easily obtained in the form of one of its alkali metal salts, I prefer to use the alkali metal salts of 1,3-dicyanoguanidine in my new reaction in the preparation of N1-di-substituted melamines.

The preferred reactants of the present invention comprise a salt of a secondary amine and an alkali metal salt of 1,3-dicyanoguanidine. The use of these salts does not effect the ultimate outcome of the reaction inasmuch as during the first stages of the reaction the acidic portion of the secondary amine salt reacts with the alkali metal salt of the 1,3-dicyanoguanidine resulting in the formation of an inorganic salt, such as potassium chloride, and the amine salt of 1,3-dicyanoguanidine as illustrated in the first equation above. I may, of course, use the free amine base and the free 1,3-dicyanoguanidine acid as illustrated, but for reasons just stated the respective salts of these materials are preferred.

A large number and variety of secondary amines may be used in accordance with my process to prepare the corresponding substituted melamines. I may, for example, use such secondary amines as diethylamine, dimethylamine, di-n-butylamine, di-isopropylamine, didodecylamine, dioctadecylamine, morpholine, piperidine, dicyclohexylamine, methylaniline, methylnitroaniline, ethylaniline, diphenylamine, 2,3-benzopiperidine, etc. These secondary amines are used in the form of their free bases or in the form of one of their acid salts such as the hydrochloride, phosphate, nitrate, carbonate, or the like.

The 1,3-dicyanoguanidine may be used in the form of the free acid or as one of its many salts such as for example, potassium, sodium, ammonium, guanidine, magnesium, calcium, strontium or the like.

In carrying out the reaction, it is merely necessary to mix together the desired secondary amine salt and the 1,3-dicyanoguanidine salt and heat the mixture. Solvents may be used if desired, but the use of such is not necessary as will be noted in the specific examples. Water and other inert solvents such as Cellosolve, pyridine, etc., may be used if desired. The temperature of the reaction is not particularly critical. Any temperature from about 60° C. or higher, up to the decomposition point of the product, may be used. The temperature of a steam bath, about 100° C., is suitable, but temperatures up to 200° C. may be used to advantage when heating the materials together in the absence of a solvent.

Although it is not necessary to regulate the pH of the reaction mixture, it is found that the aliphatic amines react best at a pH between six and eight, whereas the aromatic amines appear to react best at a pH of about two to seven. Both the aliphatic and aromatic amines will react with 1,3-dicyanoguanidine under other pH conditions, however.

My invention will now be illustrated in greater particularity by means of the following specific examples: It will be understood, of course, that these examples are merely illustrative and are not intended to limit my invention to the particular reactants or conditions described therein. All parts are by weight unless otherwise indicated.

Example 1

11.0 g. (0.1 mol) of diethylamine hydrochloride and 14.7 g. (0.1 mol) of mono-potassium 1,3-dicyanoguanidine were heated in an oil bath kept at 150° C. At 60° C. the mixture became soft; at 98° C., pasty; and at 145° C. an exothermic reaction caused the temperature to rise to 190° C. After cooling in an ice bath the material, which was now a thick gum, was heated at 145° C. for 45 minutes or until heat was no longer evolved. The product was dissolved in dilute hydrochloric acid, filtered, and reprecipitated to obtain 7 g. of slightly impure $N_1$-diethyl melamine. The product was dissolved in methanol, the insoluble impurities separated by filtration and the diethyl melamine was precipitated by dilution of the filtrate with water.

Example 2

165 g. (1.0 mol) of N-dibutylamine hydrochloride and 147 g. (1.0 mol) of mono-potassium 1,3-dicyanoguanidine were mixed together as thoroughly as possible in a mortar. The mixture was spread on trays and heated in a forced draft oven at 138° C. for about 4 hours. The dibutyl melamine which formed was extracted from the solid by means of about 400 cc. of hot methanol and then precipitated by the addition of water and alkali. The free dibutyl-melamine base was then transformed to the hot-water soluble nitrate salt by treatment with nitric acid. The $N_1$-dibutyl melamine recovered from the nitrate salt upon neutralization with alkali was further purified by dissolving in acetone, filtering and then crystallizing by the addition of an equal amount of water. The crystalline solid melted to a clear liquid at 134°–135° C. The melting point of the solid when mixed with a known sample of $N_1$-dibutyl melamine was the same.

Example 3

To an aqueous suspension of 42.8 g. (0.4 mol) of methylaniline in 100 cc. of water was added 50 cc. of diluted hydrochloric acid (70 cc. concentrated hydrochloric acid diluted to 200 cc. with water). The pH of the resulting solution was about three. Four-tenths of a mol of potassium dicyanoguanidine (62 g.) was added over a period of about 10 minutes to the solution, and the mixture was then heated to 95° C. During the course of the reaction, about 45 minutes, 130 cc. more of the diluted hydrochloric acid was added from time to time to keep the pH within the range of about two to three. On cooling the solution there was obtained 101 g. of $N_1$-methyl-$N_1$-phenyl melamine hydrochloride. After filtering off the crystals 9.7 g. of $N_1$-methyl-$N_1$-phenyl melamine was obtained from the filtrate. The amount of substituted melamine recovered represented a quantitative yield.

I claim:

1. A process of preparing $N_1$-di-substituted melamines which comprises bringing together and reacting a secondary amine and 1,3-dicyanoguanidine.

2. A method of preparing $N_1$-di-substituted melamines which comprises mixing together a secondary amine salt of an acid and a salt of 1,3-dicyanoguanidine and heating the mixture.

3. A method of preparing $N_1$-di-aliphatic-substituted melamines which comprises mixing together an aliphatic secondary amine salt of an acid and a salt of 1,3-dicyanoguanidine and heating the mixture.

4. A method of preparing $N_1$-di-aromatic-substituted melamines which comprises mixing together an aromatic secondary amine salt of an acid and a salt of 1,3-dicyanoguanidine and heating the mixture.

5. A method of preparing $N_1$-di-substituted melamines which comprises mixing together a secondary amine salt of a mineral acid and an alkali metal salt of 1,3-dicyanoguanidine and heating the mixture at a temperature of at least 60° C. until a substituted melamine is obtained.

6. A method of preparing $N_1$-di-aliphatic-substituted melamines which comprises mixing together an aliphatic secondary amine salt of a mineral acid and potassium 1,3-dicyanoguanidine and heating the reaction mixture at a temperature of at least 60° C. until a substituted melamine is formed.

7. A method of preparing $N_1$-methyl-$N_1$-phenyl melamine which comprises mixing together methylaniline hydrochloride and potassium 1,3-dicyanoguanidine and heating the reaction mixture to at least 60° C. while maintaining the pH within the range of about two to seven until $N_1$-methyl-$N_1$-phenyl melamine is formed.

8. A method of preparing $N_1$-diethyl melamine which comprises mixing together diethylamine hydrochloride and potassium 1,3-dicyanoguanidine and heating the reaction mixture to at least 60° C. until $N_1$-diethyl melamine is formed.

DANIEL E. NAGY.